June 22, 1954
R. H. CARTER
2,681,486
BELT SPLICE
Filed June 16, 1950
2 Sheets-Sheet 1
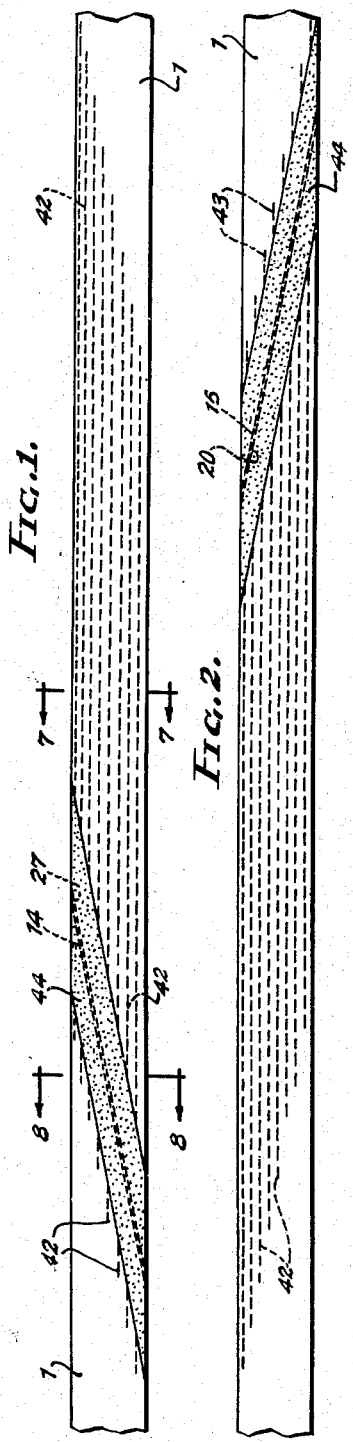
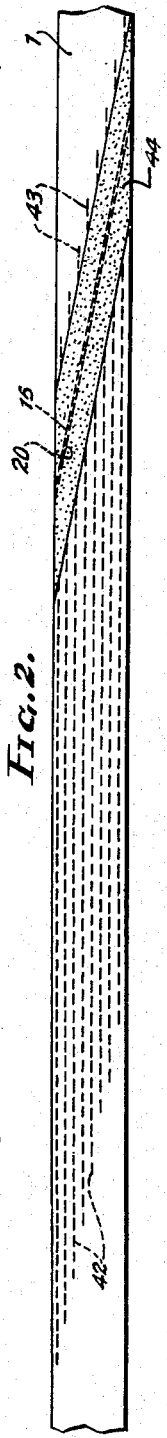
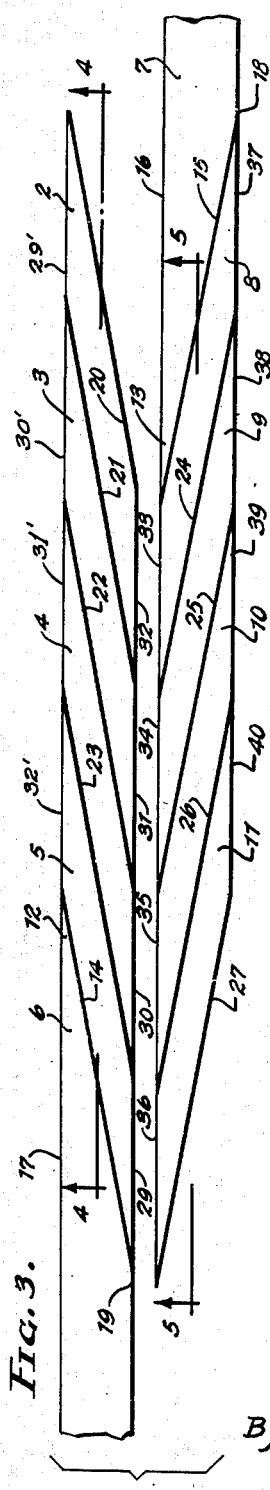
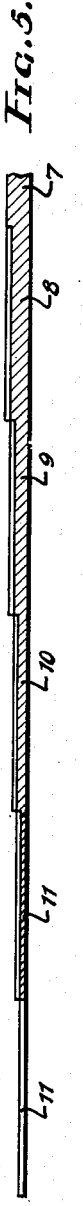
INVENTOR
RALPH H. CARTER.
By Bley & Worischek
ATTORNEYS June 22, 1954

R. H. CARTER 2,681,486

BELT SPLICE

Filed June 16, 1950

INVENTOR
RALPH H. CARTER.

BY Bley & Worischek

ATTORNEYS

Patented June 22, 1954

2,681,486

UNITED STATES PATENT OFFICE 2,681,486

BELT SPLICE

Ralph H. Carter, Johnson City, Tenn., assignor to North American Rayon Corporation, New York, N. Y., a corporation of Delaware Application June 16, 1950, Serial No. 168,465

3 Claims. (Cl. 24—38)

The present invention relates to improvements in belt splices and more particularly splices intended for joining the ends of flat belts constituted of superposed plies of rubberized fabric.

It is an object of the invention to provide an improved belt splice adapted for joining sections of rubberized flat fabric belts into lengths of any desired extent or for joining together the ends of a given piece of belting to form a so-called endless belt of any desired size.

A further object is to provide a belt splice wherein the overlapping ends are constituted of two similar, mutually facing sets of long, narrow, flat steps formed out of the plies of the belt body per se and stitched and vulcanized together in a novel manner.

Another object is to form the splice of two sets of mutually facing steps constituted of a plurality of superposed long narrow strips of parallelogram shape topped by a surface strip of triangular shape having an extremely acute apex angle so that when the sets of steps are faced against each other, the seam produced by the abutment of the hypothenuse of a triangular strip with a diagonally running edge of a strip of parallelogram shape will extend across the belt as an extremely acute diagonal, and so that the seams thus formed will be substantially parallel to each other but disposed on opposite sides of the belt and at a relatively great distance from each other, to the end that the splice will be distributed over a relatively large internal area of the belt body in the region between such diagonally extending surface seams.

Still another object is to taper the triangularly shaped layer of fabric on the surface of each side of the belt so gradually and with such an acute apex or tip angle as to effect a substantially point-like presentation or entry of the splice to the pulley when the belt is in use and thus reduce to a minimum the so-called "stubbing" of the seam of the splice against the pulley and the gradual destruction of the splice, irrespective of the direction in which either surface of the belt is approaching the pulley.

A still further object is to cover the area in the vicinity of the diagonally extending terminal surface seam of the splice with a layer of rubber vulcanized in place, blended off in feather-edged fashion to each side of said seam and extending substantially into the stitching.

An additional object is to provide parallel rows of stitches extending longitudinally of the belt and substantially within the confines of the splice, the portions of the stitches that pass through the belt body between the surface seams being converted into internal rubberized rivets integrally bonded to the structure of the plies through which they pass and the stitches that pass through the diagonal surface seams being completely immersed in and bonded with the rubber covering of the seams as well as being integrally bonded to the internal structure of the plies through which they pass.

In splicing belts constituted of layers or plies of rubberized fabric it has been customary in the art to cut away such layers in the form of so-called "steps" and to effect the splicing by uniting such steps in mutually facing relation as by cementing and vulcanizing. Heretofore however these steps were either cut straight across the belt, substantially at right angles to its length, or else along a relatively slight diagonal crosswise of the belt body. In both cases the splice was confined to a very small longitudinal extent of the belt body. It has been found however that this subjects the splice to destructive strains, especially when such rubberized fabric belts are used with pulleys of relatively small diameter. The physical properties of the belt material within and adjacent the splice per se necessarily differ somewhat from those of the adjacent belt body due to the second vulcanization necessitated by the splicing operation. In most cases the splice behaves as an area somewhat more indurated than the rest of the belt. Therefore, unless the splice is distributed along an appreciable extent of the belt and is integrally blended into the adjacent body structure the splice is prone to break loose when repeatedly kneaded and flexed as by passage over a pulley. Moreover, the ends of the topmost terminal or final steps, two of which appear in edge-abutting relation on each side or surface of the belt, have heretofore always presented a seam extending either perpendicularly crosswise of the length of the belt or along a very slight diagonal. This presents a seam which strikes against the pulley and the constant pounding which the splice thus suffers gradually leads to its deterioration.

In accordance with the present invention these drawbacks are obviated by providing an improved belt splice which extends through and along a relatively large portion of the belt body so as to avoid sudden presentation to the pulley of localized areas having physical properties differing from those of the rest of the belt. In addition, the belt approaches the pulley through agency of the point-like ends of the terminal steps on each side of the belt so that no stubbing of the seam against the pulley can occur, the approach onto the pulley surface being gradual irrespective of the direction of travel of the belt.

The invention is illustrated in the drawing, where:

Fig. 1 is a plan view of a surface, for example the top surface, of a belt spliced in accordance with the present invention.

Fig. 2 shows the bottom surface of the belt of which the top surface is illustrated in Fig. 1.

Fig. 3 shows the two belt ends as viewed from the top and the bottom, respectively, illustrating the method of preparing the steps, the parts being shown ready for sizing.

Fig. 4 is a section taken on line 4—4 of Fig. 3.

Fig. 5 is a section analogous to Fig. 4, taken on line 5—5 of Fig. 3.

Fig. 6 shows the belt ends stitched together and an additional sheet of tie gum placed over the surface abutment seam.

Figure 7:
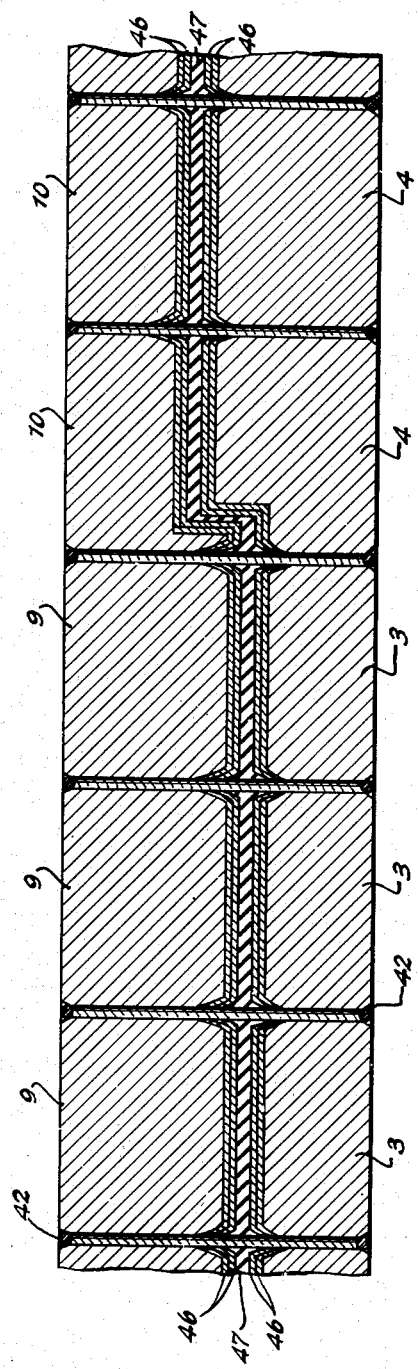
Fig. 7 is a greatly enlarged fragmentary cross-sectional view taken along line 7—7 of Fig. 1 and showing the bonding of the stitches into the internal belt body structure.

Referring in detail to the drawing, the numeral 1 designates generally a flat machine drive belt composed of a suitable number of superposed plies of rubberized fabric, vulcanized together. In the embodiment chosen to illustrate the invention, five of such plies are shown, but the splicing method herein described is applicable to belts composed of a greater or lesser number of plies.

In making the splice, the belt ends are first prepared as shown in Fig. 3. The same method is applicable to endless belts produced by joining a single piece end to end as well as to long belts made up of separate pieces joined together. In either case the ends are prepared so as to produce a series of "steps" having the mirror-image relationship represented by the upper and lower portions shown in Fig. 3. In this figure the steps in the upper piece of the belt are numbered 2, 3, 4, 5 and the steps of mirror-image relation thereto in the lower piece of belting are numbered 8, 9, 10, 11. Hence, if the lower portion is turned over and upwardly so as to have the steps mutually face and contact with each other as hereinafter explained, the plies will make contact in the relation represented by the numerals 2, 8; 3, 9; 4, 10; and 5, 11. The steps 2, 3, 4, 5 and 8, 9, 10, 11 are cut from the body of the belt with the aid of a suitable template and a tool adapted to cut through one ply at a time. Each ply, when cut through, is lifted and stripped off. The template is then moved forward, the next cut made, the corresponding ply stripped off, and so on until the stepped formations shown in Figs. 3, 4, and 5 are produced. The numeral 7 in the lower piece and the numeral 6 in the upper piece (Fig. 3) designate portions which are not cut away. It is also to be noted that portions 6 and 7 terminate as triangles having very acute apex angles 12 and 13 respectively. The hypothenuses are marked 14 and 15 respectively. These ends will be hereinafter referred to as triangles for convenience. The stepped portions 2, 3, 4, 5 and 8, 9, 10, 11 are of the shape of parallelograms as shown in the upper and lower portions of Fig. 3. For convenience in reference, the sides of the triangles opposite the hypothenuses are designated 16, 17; the bases of the triangles are of no appreciable significance in the discussion of the structure, serving merely to define the length of the hypothenuses; such bases, theoretically considered, and if drawn at all, would be lines drawn perpendicular to the edges of the upper and lower belt pieces at points 18 and 19. The long parallel sides of the parallelogram shaped steps extend diagonally across and are marked 20, 21, 22, 23, 14 for those of the top belt portion of Fig. 3, and 15, 24, 25, 26, 27 for those of the bottom portion of Fig. 3. The short parallel sides of the parallelogram shaped steps extend along the edges of the belt pieces and are marked 29', 30', 31', and 32' for the top series of the top belt piece in Fig. 3 and 29, 30, 31, 32 for the bottom series of the top belt piece; for the bottom belt piece of Fig. 3 the short sides at the top are numbered 33, 34, 35, 36 and the short sides at the bottom 37, 38, 39, 40. The numerals 14 and 15 for convenience indicate both the hypothenuses of the triangles as well as long sides of two of the parallelograms and may be considered as coinciding.

It is apparent that if the two mirror-image sets of steps are placed against each other in mutually facing contact, the lines 27 and 14 will abut and show as a diagonal seam at the left end on the surface of the belt. Lines 26 and 23, 25 and 22, and 24 and 21 will also abut but will be located inside the belt, whereas lines 15 and 20, when in abutting relation, will show up as a diagonal on the other side of the belt.

By way of illustrative and preferred but nonlimiting example of the method of cutting the steps, a so-called "4 by 8 lap" may be used, composed of a 4 inch "step" and 8 inch "lap." As applied, say, to the top belt piece of Fig. 3, the short sides of the parallelograms would be 4 inches in length and represent the "4 inch step" while the diagonally extending long sides would be 8 inches long and represent the "8 inch lap."

After the steps are cut as above described and have been buffed and cleaned, the parallelogram shaped portions are sized with a suitable liquid rubber cement which dries without being tacky, for example that known under the trade name of "Ton-Tex Liquid Cement V-1," manufactured by the Ton-Tex Corporation. This sizing is applied preferably twice with intermediate drying, not only to the surfaces of the steps per se, but also, as indicated at 46 in Figs. 7 and 8, to an area of about one inch on the belt surface on both sides of the hypothenuses 14 and 15 of the triangular pieces 6 and 7. After the sizing, the coated pieces need not be spliced immediately but may be set aside for future use. When the splice is to be made, a sheet of rubbery material known in the vulcanizing art as cloth-backed sheeted tie gum and obtainable under the trade name of "Ton-Tex Sheet Cement V-2," manufactured by the Ton-Tex Corporation, is applied to the sized steps, whereupon the cloth backing, referred to in the trade as "Holland cloth," is peeled off.

The ends of the belt are then overlapped so that the corresponding steps interfit and mutually face each other and so that the sheeted tie gum layers on the steps contact with each other, whereupon the belt area comprising the splice is subjected to pressure as by a rolling operation to insure intimate adhesive contacting of the two parts.

The belt thus adhesively spliced is now stitched on a lock-stitch sewing machine, using a suitable thread, e. g., preferably of nylon. The stitching is preferably effected along spaced rows extending substantially parallel to the edges of the belt, the rows of stitches being caused to pass through the diagonal seam formed by the abutment of lines 27 and 14 and 15 and 20 and also slightly beyond as indicated at 42 in Fig. 1 and by 43 in Fig. 2 and Fig. 6.

Figure 8:
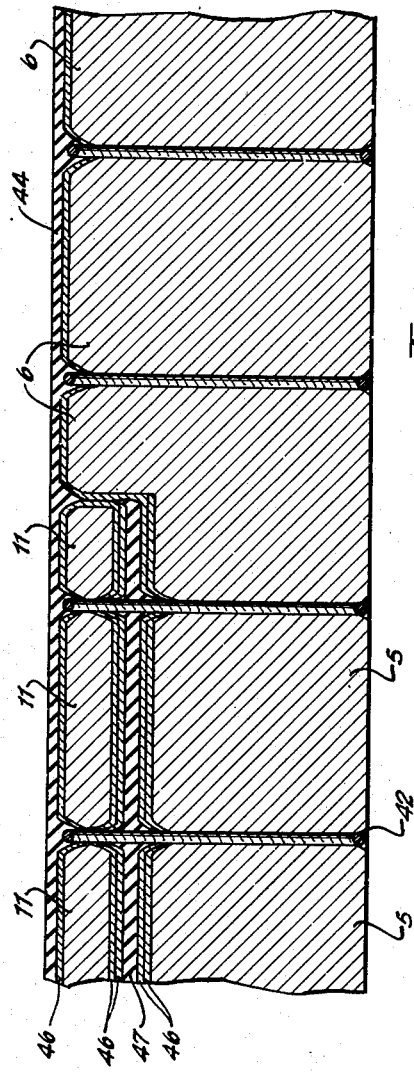
Fig. 8 is a greatly enlarged fragmentary cross-sectional view taken along line 8—8 of Fig. 1 showing the bonding of the stitches into the internal belt body structure as well as into the surface layer of tie gum placed over the seam.

After the belt is stitched, a strip of the cloth-backed sheeted tie gum hereinbefore mentioned is placed across each of the seams that extend diagonally across the belt and which are indicated by 14, 27 in Fig. 1 and by 15, 20 in Fig. 2. The tie gum as thus applied to the surface is indicated by the stippled areas 44. This tie gum should be feathered off at the edges and should blend almost imperceptibly into the surfaces at each side of the seam. Figs. 7 and 8 are very greatly enlarged fragmentary cross-sectional views of the belt after the preparations recited above have been completed and showing the belt prior to vulcanization. The stitches 42 shown in cross section are indicated by cross-hatched circles at the top and bottom, and of course extend through the belt. The two successively applied and dried coatings of sizing are indicated by 46. Although each sized area of the steps is provided with a layer of sheeted tie gum, only one layer is indicated by the numeral 47 in Figs. 7 and 8 due to the fact that the layers become welded into each other during the application of pressure. A single layer of suitable thickness may of course also be used. Figs. 7 and 8 also show how the stitches 42 become intimately immersed in the sizing and tie gum within the body of the belt and (Fig. 7) in the tie gum layer 44 on the surface of the diagonal seam.

Although the cloth-backed sheeted tie gum adheres fairly well to the seam by reason of its inherent tackiness, it may be additionally secured during the pre-vulcanization handling of the belt by means of suitable staples which can be easily removed after vulcanizing. The cloth backing is left in place to prevent direct contact between the rubber and the hot metal surface of the vulcanizer and is stripped off after vulcanizing.

The splice is then vulcanized by any suitable conventional method. After vulcanizing, the splice, due to its construction, is substantially as flexible as the belt per se and extends over a substantial length of the belt body so that it does not present a localized indurated area to the belt pulley during use. The portions of the stitches that pass through the sizing and sheeted tie gum become converted, so to speak, into rubberized rivets integrally bonded with the rubberized fabric of the plies. The portions of the stitches that pass across the diagonal seams and are covered with tie gum are not visible at all on the surface of the covered seam but become integrally bonded in the tie gum thereon, whereas the portions immediately below the seam that pass through the internal sizing and tie gum layers, become converted into rubberized rivets integrally bonded with the rubberized fabric of the plies as above recited. Either surface or side of the belt may be run against the pulley and the belt may be run in either direction inasmuch as a point-like approach or "entry" to the pulley surface is insured at each longitudinal edge of the belt.

What is claimed is:

1. A belt splice comprising a pair of belt ends each constituted of a plurality of similar layers of rubberized fabric united by means of a plurality of steps cut out of said layers and overlapped in mutually facing and contacting mirror-image fashion the steps internally of the splice being constituted as parallelograms of which the short sides coincide with the edges of the belt and the long sides extend as diagonals of substantially maximum obtainable slant across the belt, the fabric layer on the surface of the belt at each end terminating in the shape of triangles of which the hypothenuses extend in abutting relation as acute diagonal seams crosswise of the belt on each side thereof and parallel to the aforesaid similarly extending long sides of said parallelograms, said seams being parallel to each other but occurring on opposite sides of the belt and being spaced apart a substantial distance, the apex angle of each triangle on the surface being so acute as thereby to effect a substantially point-like presentation of the splice to the pulley irrespective of the direction of travel of the belt, said splice being distributed within the belt body between the pairs of abutting hypothenuses constituting the said surface seams, a vulcanizable rubber bonding material between the mutually contacting faces of the steps, a plurality of rows of nylon stitches extending through the belt and parallel to the longitudinal direction thereof and across the seam formed by the abutting hypothenuses, said stitches being converted into rubberized thread rivets by said bonding material and intimately bonded into the structure of said fabric layers.

2. A belt splice comprising a pair of belt ends each constituted of a plurality of similar layers of rubberized fabric united by means of a plurality of steps cut out of said layers and overlapped in mutually facing and contacting mirror-image fashion the steps internally of the splice being constituted as parallelograms of which the short sides coincide with the edges of the belt and the long sides extend as diagonals of substantially maximum obtainable slant across the belt, the fabric layer on the surface of the belt at each end terminating in the shape of triangles of which the hypothenuses extend in abutting relation as acute diagonal seams crosswise of the belt on each side thereof and parallel to the aforesaid similarly extending long sides of said parallelograms, said seams being parallel to each other but occurring on opposite sides of the belt and being spaced apart a substantial distance, the apex angle of each triangle on the surface being so acute as thereby to effect a substantially point-like presentation of the splice to the pulley irrespective of the direction of travel of the belt, said splice being distributed within the belt body between the pairs of abutting hypothenuses constituting the said surface seams, a vulcanizable rubber bonding material between the mutually contacting faces of the steps, a plurality of rows of nylon stitches extending through the belt and parallel to the longitudinal direction thereof and across the seam formed by the abutting hypothenuses, said stitches being converted into rubberized thread rivets by said bonding material and intimately bonded into the structure of said fabric layers, a layer of vulcanizable rubber bonding material over the diagonal seam formed by the abutting hypothenuses, said material being feather-edged at both sides of said seam to blend into the surface of the belt, the stitches in the region of said seam being rubberized within the layer of said material and being converted into rubberized thread rivets interiorly of the body of the belt.

3. A belt splice comprising a pair of belt ends each constituted of a plurality of similar layers of rubberized fabric united by means of a plurality of steps cut out of said layers and overlapped in mutually facing and contacting mirror-image fashion, the steps internally of the splice being constituted as parallelograms of which the short sides coincide with the edges of the belt and the long sides extend as diagonals so that the length of the splice is greater than the width of the belt, the fabric layer on the surface of the belt at each end terminating in the shape of triangles of which the hypothenuses extend in abutting relation as acute diagonal seams crosswise of the belt on each side thereof and parallel to the aforesaid similarly extending long sides of said parallelograms, said seams being parallel to each other but occurring on opposite sides of the belt, and a plurality of rows of stitches of nylon thread penetrating said overlapped layers of the belt throughout the belt splice, said nylon thread stitches being vulcanized to the adjoining belt fabric, said nylon thread having sufficient resilience to flex with the belt during use thereof without being loosened therefrom so that the belt splice is of a strength comparable to the strength of unspliced portions of the belt.

References Cited in the file of this patent

UNITED STATES PATENTS

| Number | Name | Date |
|---|---|---|
| 24,243 | Smith | May 31, 1859 |
| 284,221 | Murphy | Sept. 4, 1883 |
| 1,207,853 | Burrell | Dec. 12, 1910 |
| 1,303,027 | Carr | May 6, 1919 |
| 1,706,367 | Tolman | Mar. 19, 1929 |
| 1,735,686 | Kimmich | Nov. 12, 1929 |
| 2,056,278 | Kuhn | Oct. 6, 1936 |

OTHER REFERENCES

"Oxy-Acetylene Tips," Linde Air Products Co., vol. XV, No. 6, June, 1936. Patent Office Scientific Library: TS 227.A109. Page 133. Copy in 154-4, and 74-231.